United States Patent
Frank

(10) Patent No.: US 9,541,201 B2
(45) Date of Patent: Jan. 10, 2017

(54) CONTROL CONE FOR CONTROL VALVES, IN PARTICULAR ANGLE CONTROL VALVES, FOR CRITICAL OPERATING STATES

(71) Applicant: Schuf Armaturen und Apparatebau GmbH, Eppstein (DE)

(72) Inventor: Martin Frank, Hofheim (DE)

(73) Assignee: Schuf Armaturen und Apparatebau GmbH, Eppstein (DE)

( * ) Notice: Subject to any disclaimer, the term of this patent is extended or adjusted under 35 U.S.C. 154(b) by 132 days.

(21) Appl. No.: 14/322,938

(22) Filed: Jul. 3, 2014

(65) Prior Publication Data

US 2015/0008354 A1 Jan. 8, 2015

(30) Foreign Application Priority Data

Jul. 5, 2013 (DE) .................... 20 2013 102 961 U

(51) Int. Cl.
 *F16K 1/38* (2006.01)
 *F16K 47/00* (2006.01)
(52) U.S. Cl.
 CPC .............. *F16K 1/385* (2013.01); *F16K 1/38* (2013.01); *F16K 47/00* (2013.01)
(58) Field of Classification Search
 CPC ............ F16K 1/38; F16K 1/385; F16K 47/00
 USPC ................................ 251/122, 333
 See application file for complete search history.

(56) References Cited

U.S. PATENT DOCUMENTS

| | | | |
|---|---|---|---|
| 1,418,911 A | 6/1922 | Garlick | |
| 1,758,119 A * | 5/1930 | Le Moon | B05B 1/265 239/107 |
| 2,111,549 A | 3/1938 | Blanchet | |
| 2,170,395 A * | 8/1939 | Anderson | B65D 49/06 215/25 |
| 2,743,905 A * | 5/1956 | Eckel | E21B 17/16 137/533 |
| 4,137,886 A | 2/1979 | Hiramatsu | |
| 4,744,340 A | 5/1988 | Kirby | |
| 5,004,009 A * | 4/1991 | Bunce | B65B 39/004 137/494 |
| 5,397,098 A * | 3/1995 | Schreiner | F16K 31/52433 251/122 |
| 5,485,815 A * | 1/1996 | Shida | F01L 3/06 123/188.11 |
| 5,687,877 A * | 11/1997 | Smolen, Jr. | B05B 11/007 222/1 |
| 5,704,391 A * | 1/1998 | McGowan, Jr. | F16K 17/12 137/454.2 |

(Continued)

FOREIGN PATENT DOCUMENTS

WO 2005049977 A1 6/2005

*Primary Examiner* — Michael R Reid
*Assistant Examiner* — Christopher Ballman
(74) *Attorney, Agent, or Firm* — Michael Soderman

(57) ABSTRACT

The invention relates to a control cone for control valves, in particular angle control valves, for critical operating states resulting from cavitation or flashing of abruptly vaporizing and erosive media, the control valve comprising a valve seat (2) and a valve stem (3) with a conical valve head (4) guided longitudinally movably therein. Starting from the rear, tapered end of the conical face (6) of the valve head (4), on the front portion adjacent thereto of the valve stem (3), a plurality of coaxially extending ribs (5) is arranged on the valve stem (3).

7 Claims, 3 Drawing Sheets

(56) References Cited

U.S. PATENT DOCUMENTS

| | | | |
|---|---|---|---|
| 5,771,852 A | 6/1998 | Heimann et al. | |
| 5,775,387 A * | 7/1998 | Kaneko | B65B 39/004 |
| | | | 141/146 |
| 6,431,521 B1 * | 8/2002 | Jones | F16K 1/38 |
| | | | 251/319 |
| 7,963,459 B1 * | 6/2011 | Sherry | B05B 1/308 |
| | | | 141/116 |
| 2001/0032954 A1 * | 10/2001 | Kawolics | F16K 41/103 |
| | | | 251/262 |
| 2007/0001137 A1 * | 1/2007 | Kingsford | F16K 1/34 |
| | | | 251/122 |
| 2007/0040136 A1 * | 2/2007 | Caprera | F16K 1/482 |
| | | | 251/122 |

* cited by examiner

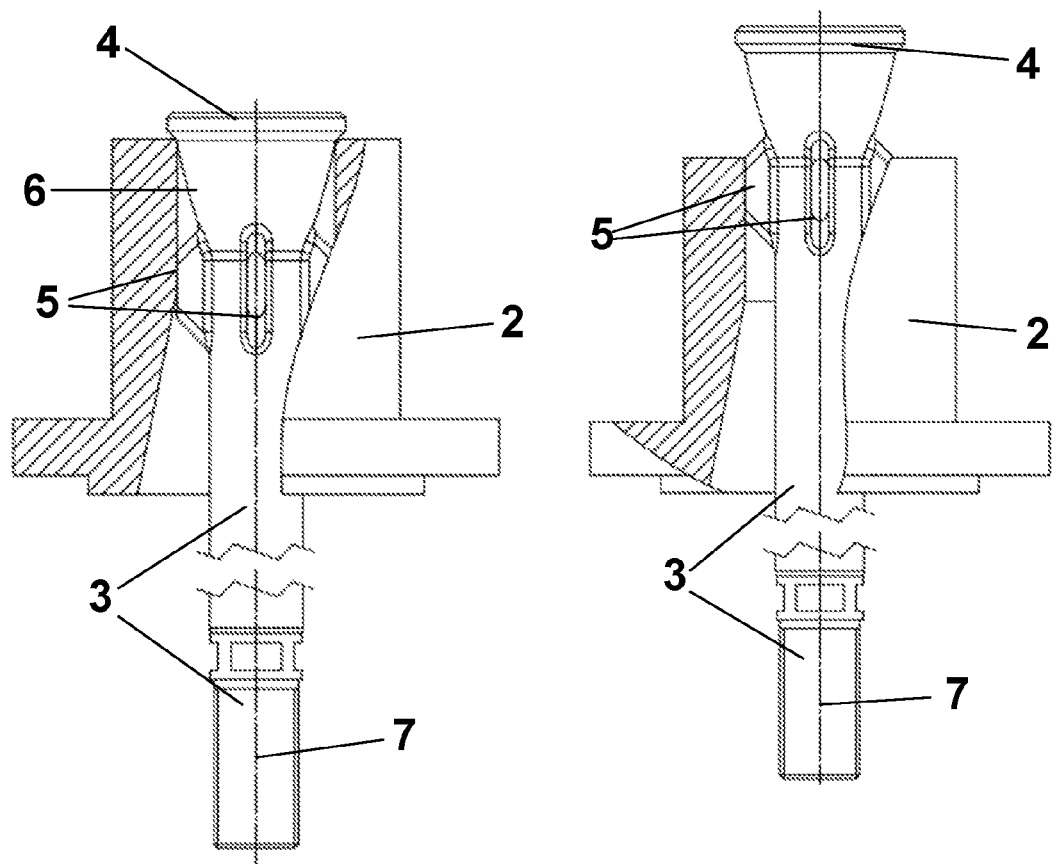
Fig. 3
Fig. 4
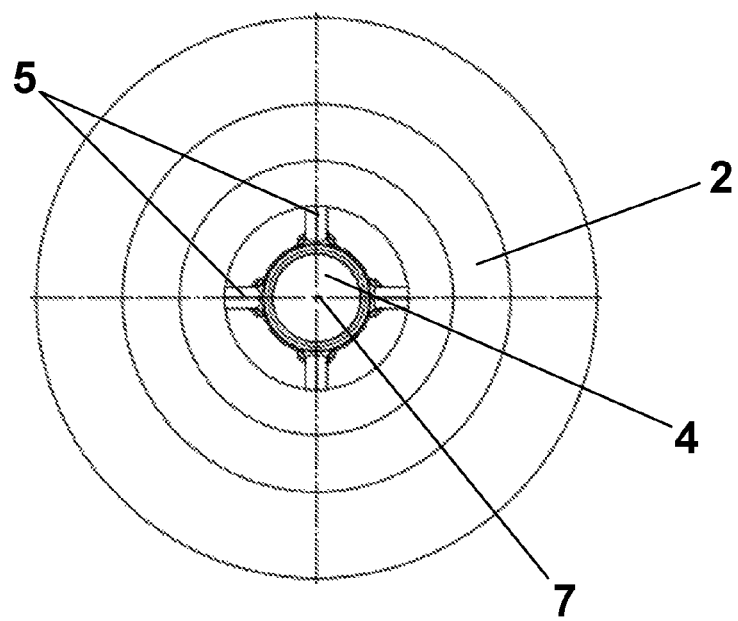
Fig. 5

CONTROL CONE FOR CONTROL VALVES, IN PARTICULAR ANGLE CONTROL VALVES, FOR CRITICAL OPERATING STATES

CROSS REFERENCE TO RELATED APPLICATIONS

This application claims the benefit under 35 USC 119 of German Application No. DE 202013102961.0 filed on Jul. 5, 2013; that application is incorporated by reference herein in its entirety.

BACKGROUND

The invention relates to a control cone for control valves, in particular angle control valves, for critical operating states resulting from cavitation or flashing of abruptly vaporising and erosive media, the control valve comprising a valve seat and a valve stem with a conical valve head guided longitudinally movably therein.

In many processes control valves are used to control level or pressure in an upstream reactor/vessel. The pressure in the valve inlet Pi is roughly the same as the pressure in the upstream reactor/vessel, since this is in balance with the gas mixture above the liquid in the upstream reactor/vessel. Pi is accordingly roughly the same as Pv, the vaporisation pressure of the medium. Thus a situation arises in the control valve on the lower-pressure side in which the outlet pressure Po is a long way below Pv.

It is thus certain that the medium will vaporise or degas as soon as the pressure drops in the control valve. This is the case once the medium has passed through the valve seat. As the medium vaporises, it needs significantly more space. The medium would require approximately 1000 times more space, since the mass flow rate remains constant and the density of the gas is approximately 1000 times lower than the density of the liquid. Since there are no good possibilities for expansion in a normal straight-way valve, the control valve is obstructed and cavitation in the medium helps to destroy the materials of the valve seat, valve cone and valve housing.

A first remedy involves the use of an angle control valve, in which the medium can expand and accelerate unimpeded downstream. However, this also means that the medium "shoots" at very high speed through the downstream pipe and may possibly destroy everything lying in its path. This could also lead to destruction of the downstream reactor/vessel.

A further possible remedy consists in a per se known angle control valve according to FIG. 1 with a control cone which opens outwards, i.e. out of the valve. This only functions if the control valve is mounted directly on the inlet flange of the downstream reactor/vessel. The control cone then opens directly into the reactor/vessel, such that the liquid may expand through vaporisation, since, compared with the pipe, the vessel offers vastly more space for expansion. This significantly reduces acceleration of the medium downstream of the control valve.

However, there is generally high lateral pressure on the control cone, so meaning that the latter has to be guided. This is achieved by a plurality of ribs (FIG. 2), which extend coaxially outwards from the front edge, i.e. from the wider end of the conical face of the valve head, over the tapered end thereof as far as into the front portion of the valve stem. However, in practice it is noted that these ribs disturb flow around the conical valve head, such that erosion occurs to a greater extent around the ribs in the valve seat and at the conical face.

The object of the invention is to provide a control cone for control valves of the above-mentioned type by means of which flow of the medium can be better distributed and localised erosion in the valve seat can be eliminated.

SUMMARY

The invention relates to a control cone for control valves, in particular angle control valves, for critical operating states resulting from cavitation or flashing of abruptly vaporising and erosive media, the control valve comprising a valve seat (2) and a valve stem (3) with a conical valve head (4) guided longitudinally movably therein. Starting from the rear, tapered end of the conical face (6) of the valve head (4), on the front portion adjacent thereto of the valve stem (3), a plurality of coaxially extending ribs (5) is arranged on the valve stem (3).

DETAILED DESCRIPTION

According to the invention, the object is achieved in that, starting from the rear, tapered end of the conical face of the valve head, on the front portion adjacent thereto of the valve stem, a plurality of coaxially extending ribs is arranged on the valve stem.

By setting the plurality of coaxially extending ribs back from the rear, tapered end of the conical face of the valve head to a significant distance into the front portion of the valve stem adjacent thereto, flow of the medium can be better distributed and localised erosion in the valve seat and at the conical face can be eliminated.

The subclaims represent advantageous embodiments of the invention.

Accordingly, at least two, preferably three or four ribs are arranged on the valve stem.

According to a further embodiment of the control cone according to the invention, the ribs arranged coaxially on the valve stem extend parallel to the centre axis of the valve stem. This means that, in their lengthwise extension, the ribs are aligned exactly parallel to this centre axis, such that media flow can be well distributed.

In order to be able furthermore optimally to influence media flow, according to an alternative embodiment of the control cone, the ribs arranged coaxially on the valve stem extend at an angle to the centre axis of the valve stem, such that they extend lengthwise in each case inclined to the centre axis.

According to a further embodiment of the invention, the front and/or rear ends of the ribs are bevelled. This means that, in their lengthwise extension, the ribs taper coaxially outwards. It is also possible for the longitudinal side faces of the ribs to taper coaxially outwards. Furthermore, both the front and/or rear ends and the longitudinal side faces of the ribs may taper coaxially outwards.

Provision may furthermore be made for the ribs to extend slightly into the rear tapered end of the conical face. This leads to better flow behaviour and low erosion.

The ribs, stem and cone are preferably made from one piece, in order to achieve a strong, stable joint with the valve stem. Alternatively, the ribs and or the cone may be welded to the valve stem.

It goes without saying that the above-mentioned features and those still to be explained below may be used not only in the respectively stated combination but also in other combinations or alone, without going beyond the scope of the present invention.

BRIEF DESCRIPTION OF THE DRAWINGS

The concept underlying the invention is described in greater detail in the following description with reference to exemplary embodiments illustrated in the drawings, in which:

FIG. 3 shows a valve seat with a control cone according to the invention in a first embodiment in the closed state, FIG. 4 shows the valve seat with the control cone according to FIG. 3 in the open state, FIG. 5 shows a side view of the valve seat according to FIGS. 3 and 4.

DETAILED DESCRIPTION OF THE PREFERRED EMBODIMENT

Figure 1:
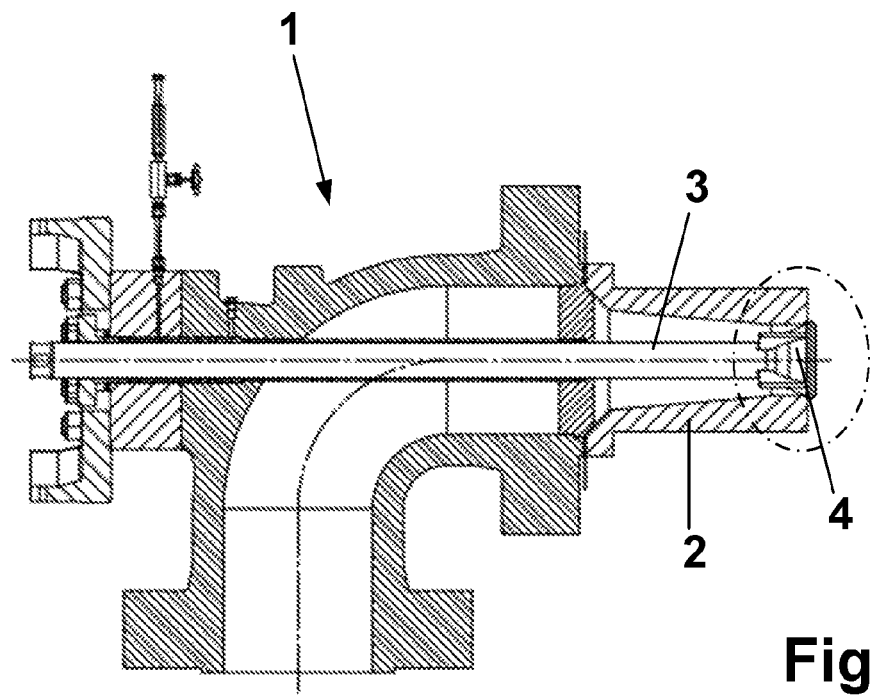
FIG. 1 is a sectional representation of an angle control valve with a control cone according to the prior art.
Figure 2:
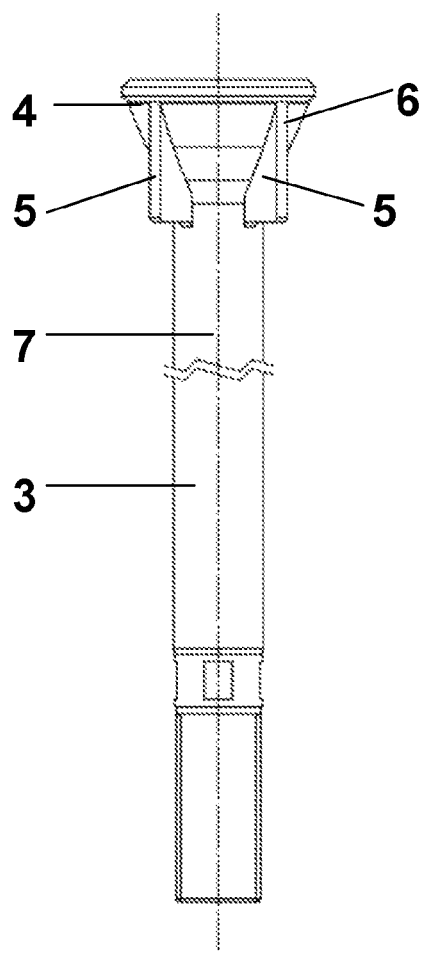
FIG. 2 is an enlarged representation of the control cone according to the prior art according to FIG. 1.

An exemplary control valve 1, in particular an angle control valve, as illustrated as prior art in FIG. 1, comprises a valve seat 2. Guided in said valve seat is a valve stem 3 movable lengthwise therein, having a conical valve head 4 and being designated hereinafter overall as a "control cone". The conical valve head 4 tapers from its free, wide, front end towards the valve stem 3 arranged lengthwise thereon, as shown in particular in FIGS. 3 and 4 and FIGS. 6 and 7.

At the front portion of the valve stem 3, which adjoins the tapered end of the valve head 4, there is arranged a plurality of ribs 5 projecting coaxially on the valve stem 3, said ribs starting at the rear, tapered end of the conical face 6 of the valve head 4. The front and rear ends of the ribs 5 are bevelled, such that the ribs 5 taper outwards.

FIGS. 3 to 5 show a control cone with valve seat 2 in a first embodiment. Four ribs 5 arranged coaxially on the valve stem 3 are arranged parallel to the centre axis 7 thereof and are either welded to the valve stem 3 or preferably turned from one piece.

Figures 6, 7:
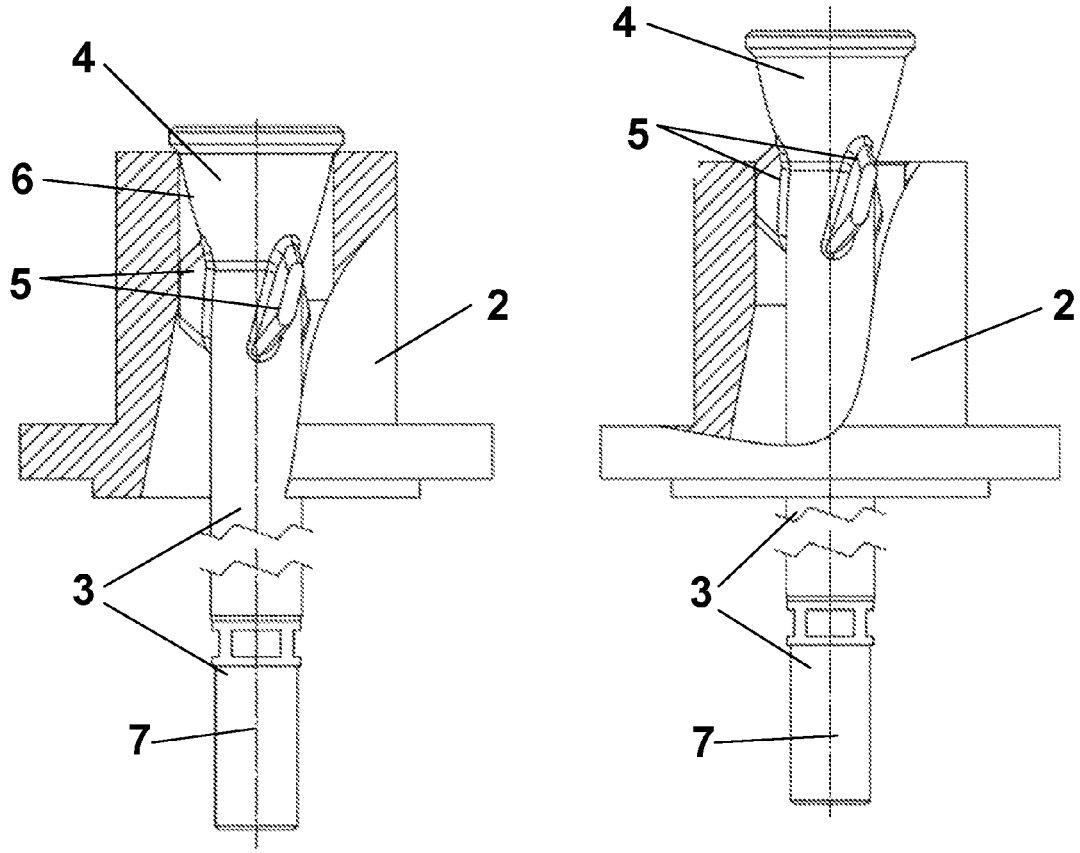
FIG. 6 shows a valve seat with a control cone according to the invention in a second embodiment in the closed state.
FIG. 7 shows the valve seat with the control cone according to FIG. 6 in the open state.
Figure 8:
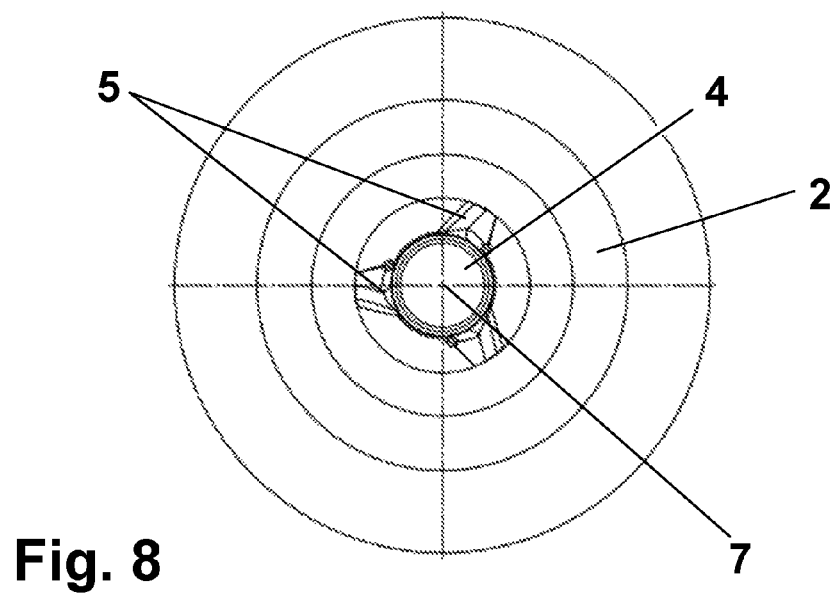
FIG. 8 shows a side view of the valve seat according to FIGS. 6 and 7.

FIGS. 6 to 8 show a control cone with valve seat 2 in a second embodiment. Three ribs 5 arranged coaxially on the valve stem 3 are arranged at an angle to the centre axis 7 thereof and are likewise either welded to the valve stem 3 or preferably turned from one piece.

Furthermore, the ribs 5 may extend slightly into the rear, tapered end of the conical face 6 of the valve head 4.

LIST OF REFERENCE NUMERALS

1 Control valve
2 Valve seat
3 Valve stem
4 Valve head
5 Rib
6 Conical face
7 Centre axis

The invention claimed is:

1. A control cone for control valves (1) for critical operating states resulting from cavitation or flashing of abruptly vaporising and erosive media, the control valve (1) comprising a valve seat (2) and a valve stem (3) with a conical valve head (4) guided longitudinally movably therein, said valve stem having a substantially constant diameter and being directly connected to said conical valve head, and said conical valve head extending from the point at which the diameter of the valve stem starts broadening beyond its substantially constant diameter to the rim of the valve head, wherein, starting from the tapered end of the conical face (6) of the valve head (4), on the front portion adjacent thereto of the valve stem (3), a plurality of coaxially extending ribs (5) is arranged on the valve stem (3), a lesser share of the overall length of said ribs (5) extending adjacent to the tapered end of the conical face (6) and a greater share of the overall length of said ribs (5) extending adjacent to the valve stem, wherein the extension of said ribs adjacent to the tapered end of the conical face in the direction of the valve head is the lesser part of the length of the conical face between the base connection with the valve stem and the rim of the valve head, and wherein the front and rear ends of the ribs (5) are bevelled.

2. The control cone according to claim 1, characterised in that at least two ribs (5) are arranged on the valve stem (3).

3. The control cone according to claim 1, characterised in that the ribs (5) arranged coaxially on the valve stem (3) extend parallel to the centre axis (7) of the valve stem (3).

4. The control cone according to claim 1, characterised in that the ribs (5) arranged coaxially on the valve stem (3) extend at an angle to the centre axis (7) of the valve stem (3).

5. The control cone according to claim 1, characterised in that the ribs (5) are made from one piece with the valve stem (3).

6. The control cone according to claim 1, characterised in that the ribs (5) are welded together with the valve stem (3).

7. The control cone according to claim 1, characterised in that the longitudinal side faces of the ribs taper coaxially outwards.

* * * * *